June 14, 1938. H. A. SMITH 2,120,718
CORN POPPER
Filed Nov. 1, 1937
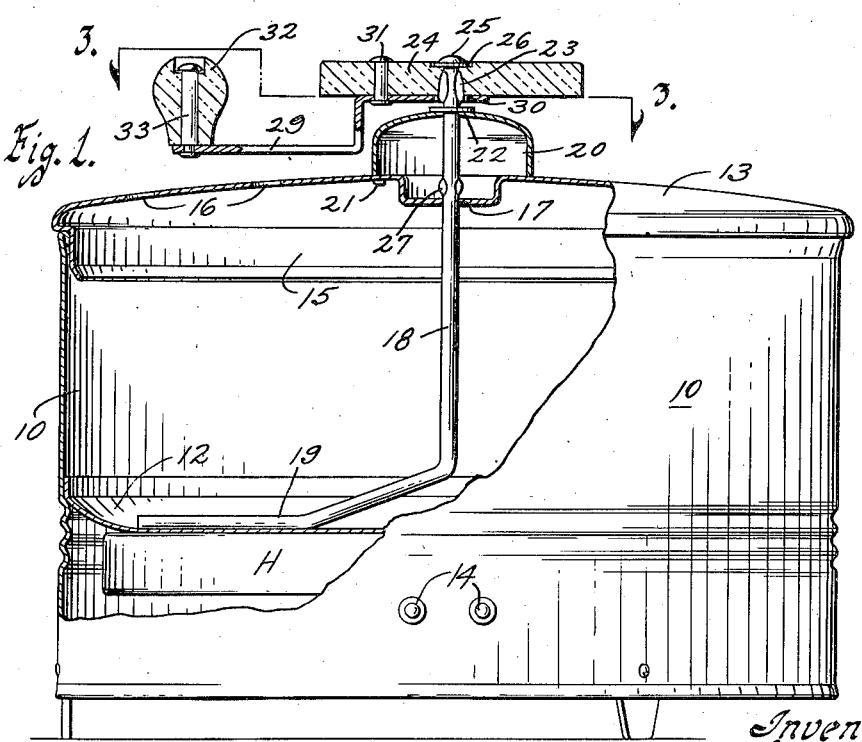
Inventor
Howard A. Smith
by Bair & Freeman
Attorneys
Witness
H. S. Munzenmaier Patented June 14, 1938

2,120,718

UNITED STATES PATENT OFFICE 2,120,718

CORN POPPER

Howard A. Smith, St. Louis, Mo., assignor to Knapp-Monarch Company, St. Louis, Mo., a corporation of Missouri Application November 1, 1937, Serial No. 172,187

9 Claims. (Cl. 53—4)

An object of my invention is to provide a corn popper or the like with novel means to operate the same, such means being simple and inexpensive to manufacture.

Another object is to provide an agitator for a corn popper or the like, the popper having a removable cover provided with an operating knob so associated with the agitator that it serves both the purpose of operating the agitator and removing the cover.

A further object is to provide the operating knob normally positioned close to the cover for reducing the overall height of the corn popper, the shank of the agitator having lost motion connection with the cover whereby when the operating knob is lifted it moves to a position spaced from the cover so that the fingers of the operator, though initially closely adjacent the heated cover at the time of grasping the knob, will thereafter be substantially spaced from the cover as the knob is lifted so that the cover can be removed, and supported in the hand if desired, with a maximum of comfort.

Still another object is to provide an operating crank associated with the knob whereby the agitator may be conveniently operated to prevent pop corn from sticking to the bottom of the popper kettle.

With these and other objects in view, my invention consists in the construction, arrangement and combination of the various parts of my corn popper or the like, whereby the objects contemplated are attained, as hereinafter more fully set forth, pointed out in my claims, and illustrated in the accompanying drawing, in which:

Figure 1 is a side elevation of a corn popper or the like embodying my invention, parts thereof being broken away and other parts being shown in vertical cross section to illustrate details of construction.

Figure 2 is a side elevation of a portion of the cover and the agitator, the cover being removed from the popper kettle and portions of this figure also being broken away and other portions being shown in section; and Figure 3 is a sectional view on the line 3—3 of Figure 1.

On the accompanying drawing I have used the reference numeral 10 to indicate in general a popper kettle. The kettle 10 has a bottom 12. The kettle together with its bottom and in conjunction with a removable cover 13 form a heated receptacle for popping corn or the like.

For heating the receptacle, a heating element H is illustrated which may be of the usual electric type, having terminal connections or prongs 14. A supply cord (not shown) may be associated with the prongs 14 in the customary manner for supplying current to energize the heating element. The cover 13 has a depending flange 15 whereby the cover may be properly positioned relative to the kettle 10. The cover may be provided with several perforations 16 to permit escape of vapor. The cover 13 is perforated at 17 to receive a shank 18 of a stirrer or agitator rod. The stirrer or agitator portion thereof is indicated at 19 and is adapted for traversing the popper kettle bottom 12 to prevent kernels of pop corn from sticking thereto and burning.

An extension 20 of approximately dome-shape is secured to the cover 13 as by ears 21 extending through perforations in the cover and bent over inside the cover. The cover extension 20 is perforated at 22 to also receive the shank 18 of the stirrer rod. The shank is thus rotatably journaled relative to the cover and due to the distance between the perforations 17 and 22, the shank 18 is retained in its desired axial position relative to the cover.

Outside the cover extension 20, the shank 18 is deformed as by a pair of ears 23 pinched into opposite sides of the shank. An operating knob 24 of wood or the like is forced onto the upper end of the shank and the terminal end of the shank is then riveted as at 25 to retain the operating knob in position. A washer 26 is interposed between the knob and riveted head 25. The operating knob 24 is thus retained on the shank 18 so that the knob can be used to rotate or oscillate the shank and thereby the agitator 19 as desired.

The operating knob is also operable to serve as a handle to remove the cover 13 from the popper kettle. This is accomplished by grasping the knob and moving it upwardly whereupon its initial movement will be relative to the cover 13 as the shank 18 is slidable relative thereto. A shoulder is provided, however, as by opposite ears 27 pinched into the shank 18 which are normally spaced from the cover extension 20 as shown in Figure 1. The ears 27 permit limited sliding movement of the shank to the position shown in Figure 2 whereupon they engage the cover extension 20 and the operating knob 24 is thereafter operable to lift the cover off the popper.

Thus I am able to have the knob 24 relatively close to the popper cover 13 normally, but it is automatically moved to a position spaced therefrom so that the heat of the cover may be dissipated to the relative thick layer of air between the cover and the operator's fingers indicated at 28 in Figure 2 while supporting the cover in the hand.

For convenience in operating the agitator 18, a crank arm 29 may be provided. The crank arm has an enlarged opening 30 surrounding the shank 18 and is secured by a rivet 31 to the knob 24. The rivet 31 is spaced from the shank 18. On the outer end of the crank arm 29, a crank handle 32 is rotatably mounted on a supporting rivet 33. The handle 32 may be used for rotating the agitator if preferred instead of using the knob 24 for this purpose.

Some changes may be made in the construction and arrangement of the various parts of my corn popper or the like without departing from the real spirit and purpose of my invention, and it is my intention to cover by my claims, any modified forms of structure, or use of mechancal equivalents, which may be reasonably included within their scope.

I claim as my invention:

1. In a corn popper or the like, a popper kettle, a removable cover therefor, a stirrer within said kettle having a shank extending through said cover, an operating knob on said shank adjacent said cover and a lost motion connection between said shank and cover permitting limited movement of said knob upwardly relative to said cover when grasping the knob to remove the cover.

2. In a corn popper or the like, a popper kettle, a removable cover therefor, a shank extending through said cover, an operating knob on said shank adjacent said cover and a lost motion connection between said shank and cover permitting limited movement of said knob upwardly relative to said cover when grasping the knob to remove the cover.

3. In a corn popper or the like, a kettle, a cover therefor, an agitator within said kettle and extending through said cover, an operating knob thereon exterior of and adjacent said cover, a lost motion connection between said agitator and cover permitting limited movement of said knob upwardly relative to said cover when grasping the knob to remove the cover and a crank extending from said knob.

4. In a device in the class described, a heated receptacle, a cover therefor, an agitator within said receptacle and having a shank extending through said cover to a point exterior thereof, an operating knob secured on said shank and thereby operable to oscillate said shank upon oscillation of said knob relative to said cover and a crank arm extending from said operating knob and movable therewith.

5. In a device in the class described, a heated receptacle, a cover therefor, an agitator within said receptacle and having a shank extending through said cover to a point exterior thereof, an operating knob secured on said shank whereby said shank may be oscillated by oscillating said knob, said shank being slidable relative to said cover and a stop on said shank within said cover and normally spaced from the cover.

6. In a device of the class described, a heated receptacle, a cover therefor, a cover extension mounted on said cover, an agitator within said receptacle having a shank extending through said cover and cover extension, an operating knob exterior of said cover extension and mounted on said shank and a stop on said shank between said cover and said cover extension.

7. In a device of the class described, a heated receptacle, a cover therefor, a cover extension mounted on said cover, an agitator within said receptacle having a shank extending through said cover and cover extension, an operating knob exterior of said cover extension and mounted on said shank and a stop on said shank to permit only limited extraction of said shank from said extension when using said knob to remove said cover from said receptacle.

8. In a device in the class described, a heated receptacle, a cover therefor, an agitator within said receptacle and having a shank extending through said cover to a point exterior thereof, an operating knob on said shank and a crank arm extending from said operating knob, said crank having an opening for said shank and means for securing a portion of said crank spaced therefrom to said knob.

9. In a popper or the like, a heated receptacle, a cover therefor having a pair of spaced wall elements, a shank journaled in said wall elements and having an agitator portion within said receptacle, an operating knob exterior of said cover and secured to said shank and stop means on said shank between said wall elements and normally spaced from the outer one thereof.

HOWARD A. SMITH.